United States Patent [19]

Van Heyningen et al.

[11] 3,832,643

[45] Aug. 27, 1974

[54] MINIMAL DISSIPATION POWER CONTROLLER

[75] Inventors: Arent H. Kits Van Heyningen, Newport; Bjorn H. Engelhardt, Barrington, both of R.I.

[73] Assignee: Raytheon Company, Lexington, Mass.

[22] Filed: Sept. 21, 1972

[21] Appl. No.: 291,119

[52] U.S. Cl. .................... 330/15, 330/22, 330/30 R

[51] Int. Cl. .................... H03f 3/26

[58] Field of Search .................... 330/15, 22, 30 R, 18

[56] References Cited

UNITED STATES PATENTS

| | | | |
|---|---|---|---|
| 3,239,771 | 3/1966 | Andreatta | 330/18 |
| 3,471,795 | 10/1969 | Schilling | 330/30 R X |
| 3,471,796 | 10/1969 | Wright | 330/30 R |
| 3,579,136 | 5/1971 | Machamer | 330/30 R |
| 3,622,899 | 11/1971 | Eisenberg | 330/22 |

*Primary Examiner*—Herman Karl Saalbach
*Assistant Examiner*—Lawrence J. Dahl
*Attorney, Agent, or Firm*—David M. Warren; Joseph D. Pannone; Milton D. Bartlett

[57] ABSTRACT

A circuit particularly adapted for use with a transformer-coupled amplifier, such as a push-pull amplifier, for reducing the power dissipated across the amplifying element, typically a transistor, while retaining substantially linear operation of the circuit. The circuit comprises a plurality of branches which may be arranged in either a serial or parallel format, and further comprises means for switching successively increasing amounts of supply voltage or, alternatively, successively decreasing amounts of impedance reflected from a load driven by the circuit. The switching operations occur in response to the instantaneous values of an applied signal voltage, such as a sinusoid, such that several switchings are accomplished during each half cycle of the input sinusoidal signal.

10 Claims, 6 Drawing Figures

MINIMAL DISSIPATION POWER CONTROLLER

BACKGROUND OF THE INVENTION

Circuits utilized for driving a load, particularly power amplifier circuits such as those utilized in driving a sonar transducer, employ amplifying elements, particularly transistors, for amplifying the power of a signal to a suitable level for driving the sonar transducer. In such circuits current flows through both the load and the transistors, and voltage drops appear across the load and the transistors. As a result, substantial amounts of power are dissipated in the transistors when the transistors are utilized in a circuit providing linear amplification. This creates a problem in that additional power is required from the primary source of power and, furthermore, the selection of transistors to be utilized in the circuit is limited to only such transistors as can withstand the additional power dissipation.

SUMMARY OF THE INVENTION

The foregoing problem in circuitry of the prior art is overcome and other advantages are provided by a circuit, in accordance with the invention, which minimizes the quantity (E-IR) in the expression for the power I(E-IR) dissipated across an amplifying element serially connected to a load where E is the voltage impressed across the serial combination of the amplifying element and the load while I is the current flowing through the amplifying element and the load, and R is the resistance of the load. In the case of a transformer-coupled load, R is the resistive component of the reflected impedance. This minimization of the power dissipation across the amplifying element, which by way of example is depicted as a transistor, is accomplished in various embodiments of the invention by alternatively varying the voltage E as a function of time in accordance with instantaneous variations in the current I, or by varying the reflected value of the load resistance R as a function of time in accordance with the instantaneous value of the current I such that the difference between the two terms E and IR is maintained close to zero. For example, where the signal to be amplified has a sinusoidal waveform, the voltage E or the reflected resistance R is altered in the stepwise fashion so that at various points during each cycle of the sinusoid the power dissipated by the amplifying element is zero. The stepwise alteration in the value of E or in the reflected resistance R is accomplished as often as desired by utilizing a sufficient number of parallel branches of amplifying elements or of serially connected amplifying elements with suitable connections to a load, preferably transformer coupling, whereby the individual amplifying branches can be successively energized in accordance with the value of the input signal voltage to accomplish a switching of the voltage E or of the reflected resistance R of the circuit. Means are also disclosed for varying the applied voltage by shorting out or bypassing windings of a coupling transformer between the amplifying elements and a load to accomplish the stepwise changing of the applied voltage.

The teachings of the invention with respect to the control of electric power are also applicable to other forms of power flow such as that of a moving fluid in which case the fluid speed and pressure are analogous respectively to the electric current and voltage. The invention is particularly well suited for use in lightweight airborne power supplies for providing a constant voltage output in spite of variations in the frequency and voltage of the primary source, namely, the motor driven generators. It also provides a well defined and stable waveform when utilized in high frequency converters of direct current to alternating current.

BRIEF DESCRIPTION OF THE DRAWINGS

The aforementioned aspects and other features of the invention are explained in the following descriptions taken in connection with the accompanying drawings wherein.

DESCRIPTION OF THE PREFERRED EMBODIMENT

Figure 1:
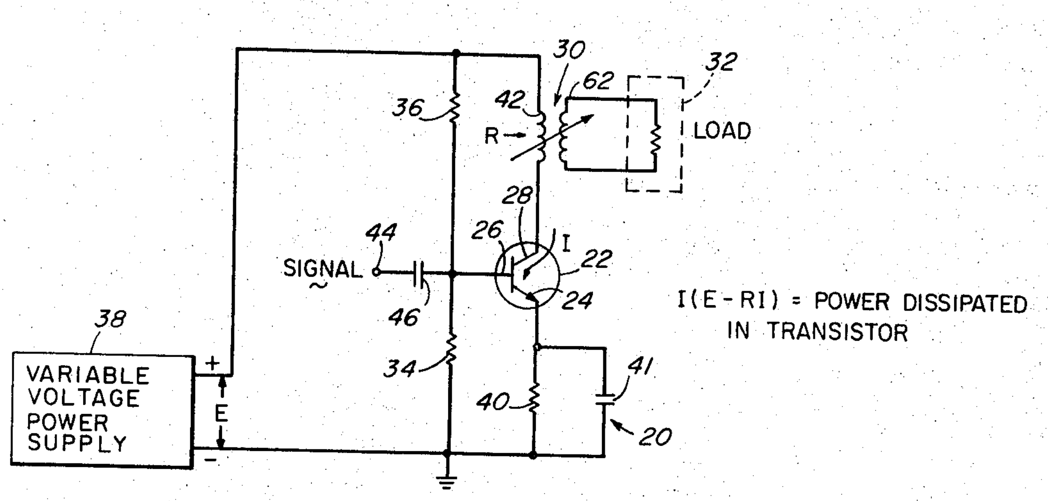
FIG. 1 is a simplified circuit having a variable power supply and variable inductor useful in explaining the principles of the invention.
Figure 2:
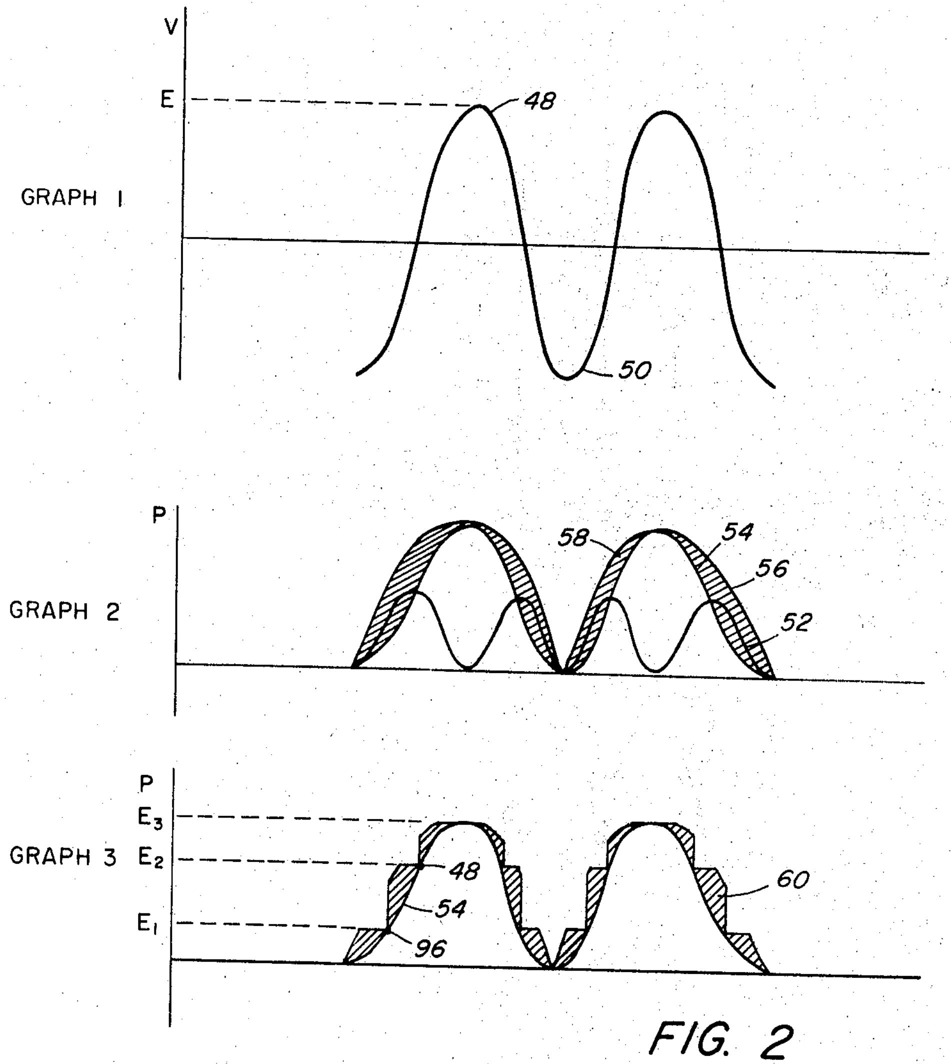
FIG. 2 is a graph of waveforms for the circuit of FIG. 1.

The basic principles of the invention are readily seen with reference to FIGS. 1 and 2. FIG. 1 shows a simplified schematic diagram of an amplifier circuit provided with a variable voltage power supply and a variable transformer, while the voltage and power waveforms of this circuit are seen in FIG. 2. The circuit of FIG. 1 shows an amplifier 20 comprising a transistor 22 having emitter, base and collector electrodes respectively 24, 26 and 28, and a transformer 30 for coupling the transistor 22 to a load 32. One form of biasing network comprising resistors 34 and 36 is coupled to the terminals of a power supply 38 and connects with the base electrode 26 of transistor 22. A resistor 40 and a bypass capacitor 41 are connected between the power supply 38 and the emitter electrode 24 to establish a bias voltage across the base emitter junction of the transistor 22. Another form of biasing circuit which is preferred because of its minimal power dissipation is disclosed hereinafter with reference to FIG. 3. The load 32 is shown as a resistive load, and the load impedance as reflected at the primary winding 42 of the transformer 30 as represented by the letter R. Current flowing through the primary winding 42 into the collector electrode 28 is represented by the letter I. The voltage produced between the positive and negative terminals of the power supply 38 is represented by the letter E. An input signal is applied to terminal 44 and coupled via capacitor 46 to the base electrode 26.

A waveform for the signal at terminal 44 is shown by way of example in Graph 1 of FIG. 2. This waveform is typically a sinusoid, as shown, but may have another well-known form such as a triangular waveform. For convenience in explaining the invention, it is presumed that at the peak of the signal waveform, indicated by numeral 48, the transistor 22 saturates, and that at the minimum point of the signal waveform, indicated by numeral 50, the transistor 22 is cut off. It is clear that at both the peak and minimum points, 48 and 50, no power is dissipated in the transistor 22 since the product of the voltage drop across the transistor times the transistor current is equal to zero. This is seen in curve 52 of Graph 2 which portrays the power dissipated within the transistor 22. It is also seen that at intermediary points, power is dissipated within the transistor 22.

As is well-known, the value of the current I flowing through the transistor 22 follows the signal current at the base terminal 26 and, accordingly, the transistor current waveform is essentially the same as the waveform portrayed by Graph 1. The power dissipated in the load 32 is proportional to the square of this current and is portrayed by curve 54 of Graph 2. The total power dissipated in the transistor 22 plus the load 32 is shown by curve 56 with the cross hatched region 58 representing the power dissipated in the transistor 22.

The total power dissipated in the transistor 22 plus the load 32 at any instant of time is given by the product of the current I and voltage E where I and E are presumed to be functions of time. The power dissipated in the load 32 is indicated by the expression $I^2R$. The difference between these two quantities, namely, I(E-IR) is the power dissipated in the transistor. In accordance with the invention, the power dissipated in the transistor is minimized by varying either E or R during each cycle of the signal at terminal 44 to minimize the expression in the parenthesis, namely, (E-IR) and thereby providing more efficient utilization of the power supplied by the power supply 38, and furthermore, permit the use of a relatively low powered transistor 22 in delivering relatively high power to the load 32.

The current I is relatively independent of the voltage E and, therefore, by varying the voltage E stepwise at successive instants during each cycle of the signal at terminal 44, the power $I^2R$ dissipated within the load 32 remains substantially unchanged while the power dissipated within the transistor 22 is greatly reduced. This effect of varying the voltage E is seen in Graph 3 of FIG. 2 wherein the curve 54 (the load power) has remained unchanged. Furthermore, this effect can be seen by comparing Graphs 2 and 3; the cross hatched region 58 of Graph 2 representing the power dissipated under conditions of constant voltage E has been reduced to the cross hatched region 60 of Graph 3. Alternatively, this minimization of the power dissipated in the transistor 22 can be accomplished by varying the value of the reflected impedance R as by varying the turns ratio between the primary winding 42 and secondary winding 62 of the transformer 30. The transformer 30 is shown in FIG. 1 with an arrow through it to indicate the capability for varying the turns ratio; the actual circuitry utilized in accomplishing this variation in turns ratio as well as circuitry for varying the supply voltage E is disclosed hereinafter with reference to FIGS. 3–6.

Referring now to the FIG. 3, there is shown an embodiment of the invention in the form of a push-pull amplifier circuit 64 comprising two driver units 66 each of which incorporates amplifying circuits in accordance with the invention, as will be described hereinafter, a power supply 68 having a plurality of terminals for providing voltages E1, E2 and E3, a signal source 70 magnetically coupled to each driver unit 66 via a transformer 72, and a transformer 74 for a coupling signal power from the driver unit 66 to a load 76. In this embodiment of the invention the expression (E-IR) is minimized by varying the value of E during successive portions of each cycle of the signal provided by signal source 70. The driver unit 66 comprises transistors 78A–C, diodes 80A–B, and biasing networks comprising the three secondary windings 82A–C of transformer 72 and two zener diodes 84B–C. The signal from the signal source 70, hereinafter referred to as the input signal and presumed to be a sinusoid, is applied via separate secondary windings 82A–C to the transistors 78A–C in combination with bias voltages developed across the base-emitter junctions of the transistors as will now be described.

Figure 3:
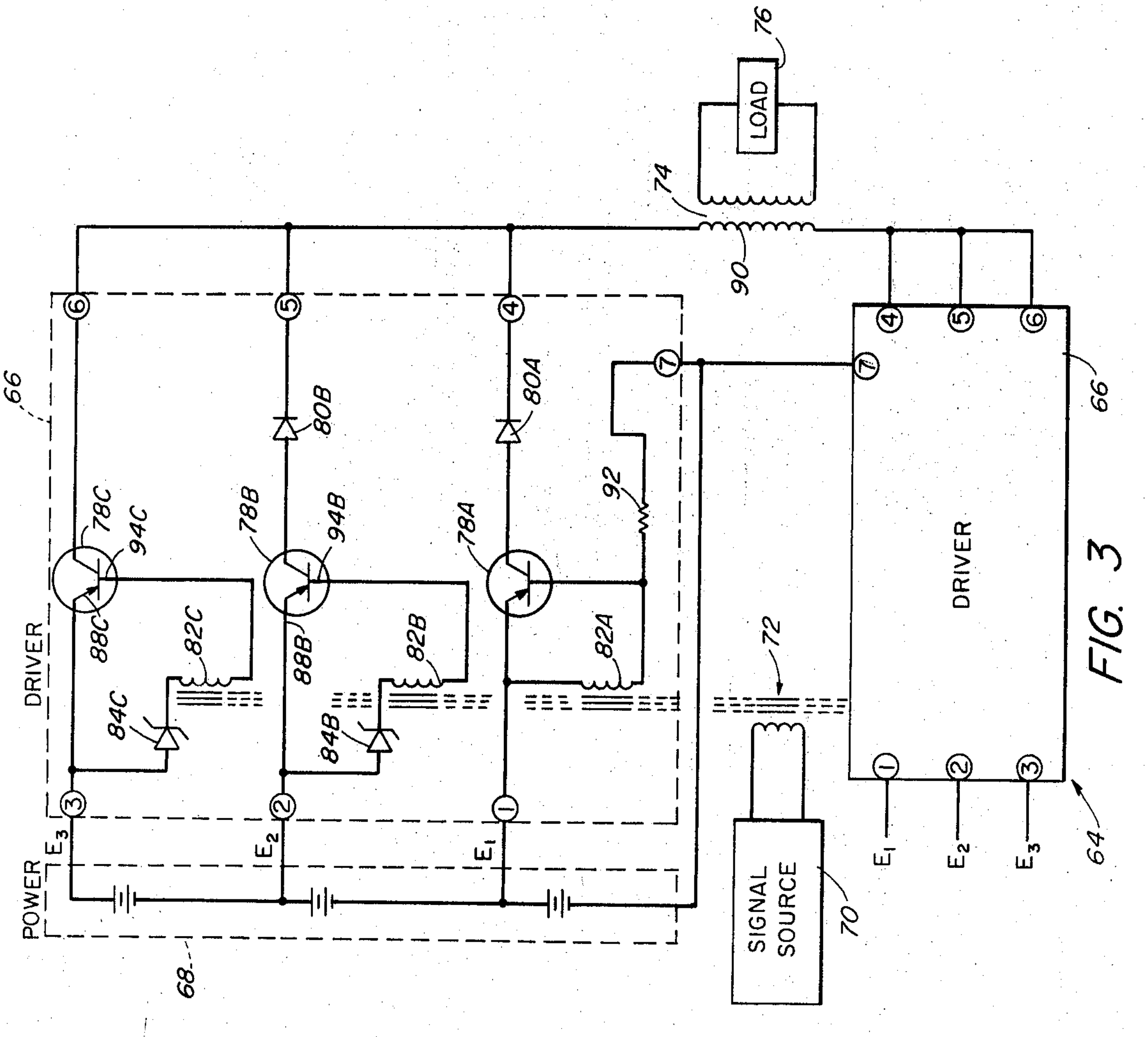
FIG. 3 is a schematic diagram of an embodiment of the invention utilizing parallel amplifier branches which are sequentially energized for varying the voltage impressed upon a load by the amplifier branches.

The various values of voltage E, shown as E1, E2 and E3 in FIG. 3, are obtained by coupling each of the transistors 78A–C within a driver unit 66 to a single terminal of the primary winding 90 of the transformer 74 while utilizing the several biasing networks for activating sequentially the transistors 78A–C. The successive activation of the transistors 78A–C is accomplished by selecting values for the zener diodes 84B–C such that the transistors 78B–C are in a state of nonconduction except at such times as a signal voltage, larger than the zener voltages of the diodes 84B–C, appears across the respective secondary windings 82A–C. The zener voltage of the diode 84C is set to a higher value than that of the diode 84B so that a larger signal must appear across the secondary winding 82C than across the secondary winding 82B to initiate conduction in the transistor 78C. The circuit of the transistor 78A is not provided with a zener diode so that the transistor 78A conducts for lower values of the signal voltage of the secondary winding 82A. If desired, a small amount of base current may be provided by a resistor 92 so that the transistor 78A conducts when the input signal drops to zero amplitude.

In operation, therefore, with respect to the first half cycle of the input sinusoidal signal, as the signal begins to build in strength, the current flow through the collector of transistor 78A increases and flows through the diode 80A into the primary winding 90 of transformer 74, thereby energizing the load 76. At this point there is no current flowing in the transistors 78B and 78C. The voltage of the secondary windings 92A–C continues to rise in value until there is sufficient voltage present at the base terminal 94B of transistor 78B to initiate conduction in the transistor 78B. This point in the operation corresponds to the point 96 in Graph C of FIG. 2. As the voltages provided by each of the secondary windings 82A–C continues to rise, there is an increase in the value of the current flowing from terminal E2 of the power supply 68 through the transistor 78B to the primary winding 90 with the result that the voltage at the junction of terminals 4, 5 and 6 of the driver unit 66 rises above the voltage E1 so that the diode 80A becomes back-biased and ceases to conduct. At this point only one transistor, namely, the transistor 78B is conducting. The procedure continues as the voltages provided by the secondary windings 92A–C continue to rise during the first cycle of the input signal until there is sufficient signal voltage presented at the base terminal 94C to initiate conduction within the transistor 78C. With reference to FIG. 2 this corresponds to the point 98 in Graph C. Further increases in the signal voltage at the secondary windings 92A–C result in an increase in the value of the voltage at the junction of the terminals 4, 5 and 6 of the driver unit 66 to a value higher than that of E2 with the result that the diode 80B becomes back-biased and ceases to conduct. At this point there is only one transistor conducting, namely, transistor 78C. When the voltages provided by the secondary windings 82A–C begins to decrease in value, the preceding procedure is reversed such that conduction is reestablished in the transistor 78B and ceases in transistor 78C, and upon a still further reduction in the value of the signal voltage, the transistor 78A again resumes conduction and the transistor 78B ceases conduction. This concludes the operation of the push-pull amplifier circuit 64 during the first half cycle of the input signal. The same procedure now occurs during the second half cycle of the input signal with respect to the other driver unit 66 as it provides current in the reverse direction through the primary winding 90 to the load 76. Thus the driver units 66 alternately provide current to the primary winding 90 in the manner of a push-pull circuit.

It is evident that the manner of operation of FIG. 3 would apply equally well in the situation where energy is conveyed in a manner other than electrically, such as by means of a fluid, in which case each transistor circuit is replaced with a fluid amplifier circuit and the transistors 78A–C are regarded as being valves to control the flow of fluid. Thus, in a general sense, the transistors 78A–C may be regarded as valves which are actuated in response to an input signal to regulate the flow of power into a load in accordance with the amplitude of the input signal.

Figure 4:
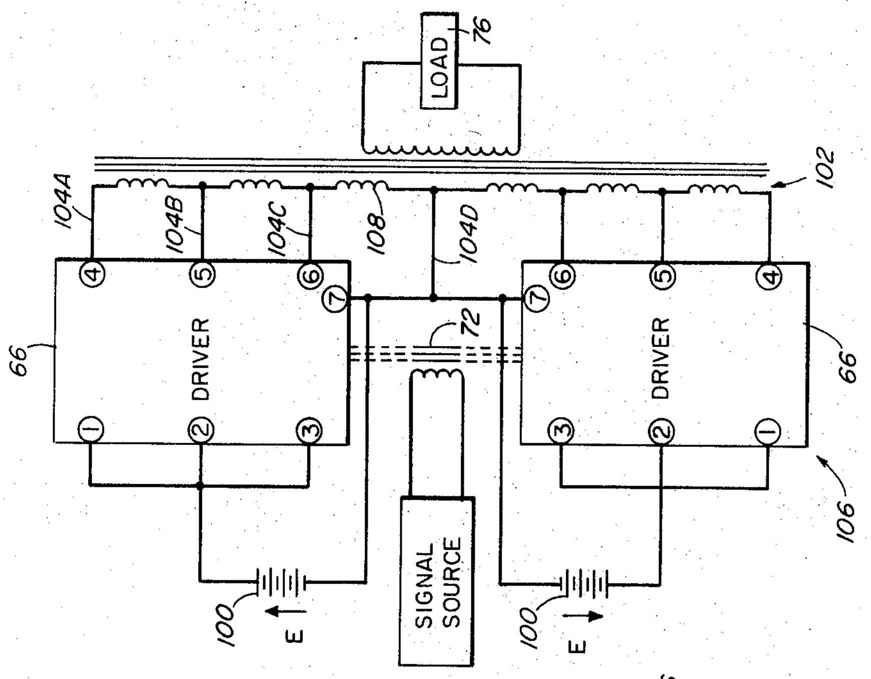
FIG. 4 is a schematic diagram of an alternative embodiment of the invention in which the parallel amplifier branches of FIG. 1 are connected to successive taps of a transformer coupling a load to the parallel amplifier branches whereby variations in the reflected impedance are obtained by the successive selection of the amplifier branches.

Referring now to FIG. 4, there is shown an alternative embodiment of the invention in which each driver unit 66 again interconnects a source of power such as a battery 100 to the load 76 via a transformer 102. Here, too, the signal source 70 is coupled via the transformer 72 to each of the driver units 66 for controlling the flow of power from the battery 100 to the load 76. In the circuit of FIG. 4, the three terminals 1, 2 and 3 of the driver unit 66 are connected to one terminal of the battery 100, and each of the terminals 4, 5 and 6 of the driver unit 66 are connected to taps 104A–C of the transformer 102. The terminal 7 of the driver unit 66 connects with the return to the battery 100 in FIG. 4 in the same manner as shown before with reference to the return wire of the power supply 68 of FIG. 3. The circuit of FIG. 4 is also a push-pull amplifier, indicated by numeral 106, and minimizes the dissipation in the driver units 66 in accordance with the invention by varying the value of R in the expression (E-IR). The value of E in the expression (E-IR) is retained constant in the push-pull amplifier 106 as readily seen by noting that the three terminals 1, 2 and 3 of a driver unit 66 are connected to the same terminal of the battery 100.

The variation in the reflected impedance R of the load 76 is accomplished in the following manner. Terminal 4 of the driver unit 66, as seen in both FIGS. 3 and 4, is connected to the end terminal of the primary winding 108 of the transformer 102. Thus the reflected impedance between the terminals 4 and 7 of the driver unit 66 has a maximum value and, similarly, the reflected voltage across the load 76 has a maximum value as seen across this terminal pair. Terminal 6 of the driver unit 66, which in FIG. 3 was utilized in applying a maximum voltage to the load 76, plays the opposite role in FIG. 4 wherein it is connected to the tap 104C nearest the center tap 104D, the voltage reflected from the load 76 appearing between the terminals 6 and 7 being the lowest of the various voltages.

In operation, therefore, when the input signal begins to rise, current passes through terminal 4 of one of the driver units 66 into the tap 104A and returns to the driver unit 66 via the center tap 104D and terminal 7, thereby energizing the load 76. The values of resistance in the resistors 82A–C and 84A–C of the biasing circuits, seen in FIG. 3, have been selected to permit successive energization of the transistors 78A–C in the manner described earlier with reference to FIG. 3, even though in FIG. 4 the terminals 1, 2 and 3 are connected to the same source of voltage. Thus, as the value of the signal from the signal source 70 continues to rise, conduction of current is initiated at terminal 5 of the driver unit 66 and enters the tap 104B of the primary winding 108. As was mentioned hereinbefore, the voltage appearing at the tap 104A is greater than that of the tap 104B which in turn is greater than that of the tap 104C due to the mutual coupling of the windings of the transformer 102 and, accordingly, upon energization of the load 76 by current flowing from terminal 5 into the tap 104B, the voltage at terminal 4 rises to a sufficiently high value to back bias the diode 80A, seen in FIG. 3, so that the transistor 78A ceases to conduct. Similarly, as the value of the input signal of the signal source 70 continues to rise still further, current flows from terminal 6 into the tap 104C causing a still further increase of the voltages at the taps 104A and 104B so that the diode 80B, seen in FIG. 3, is back biased with the result that the transistor 78B ceases to conduct. This procedure is reversed when the value of the input signal decreases such that the current at terminal 6 then terminates but reappears at terminal 5 and then terminates at terminal 5 but reappears at terminal 4. During the next half cycle of the input signal the other driver unit 66 provides current to the primary winding 108 while the first driver unit 66 is dormant.

Thus it is seen that the signal of the signal source 70 is coupled via the transformer 72 through the pair of driver units 66 and applied by the various taps 104A–C of the transformer 102 to the load 76 in a manner in which the taps of the transformer 102 are electrically connected and disconnected during successive portions of each cycle of the signal. Since each tap provides a different impedance to the driver unit 66, the value of the reflected impedance R of the load 76 is varied during the successive portions of each cycle of the input signal. When the value of the input signal is small and the current I provided by the driver unit 66 is small, the current is applied via the terminal 4 to a relatively large value of reflected impedance R; and when the value of the input signal is high, the value of the current I provided by the driver unit 66 is high, and this high current is provided by terminal 6 to a relatively low value of reflected impedance R with the result that the product IR remains substantially constant throughout each cycle of the input signal. The values of I and R are chosen such that the product IR is substantially equal to E, the voltage of the battery 100, throughout each cycle of the signal so that the expression (E-IR) is substantially zero and there is little power dissipated within the driver unit 66.

Figure 5:
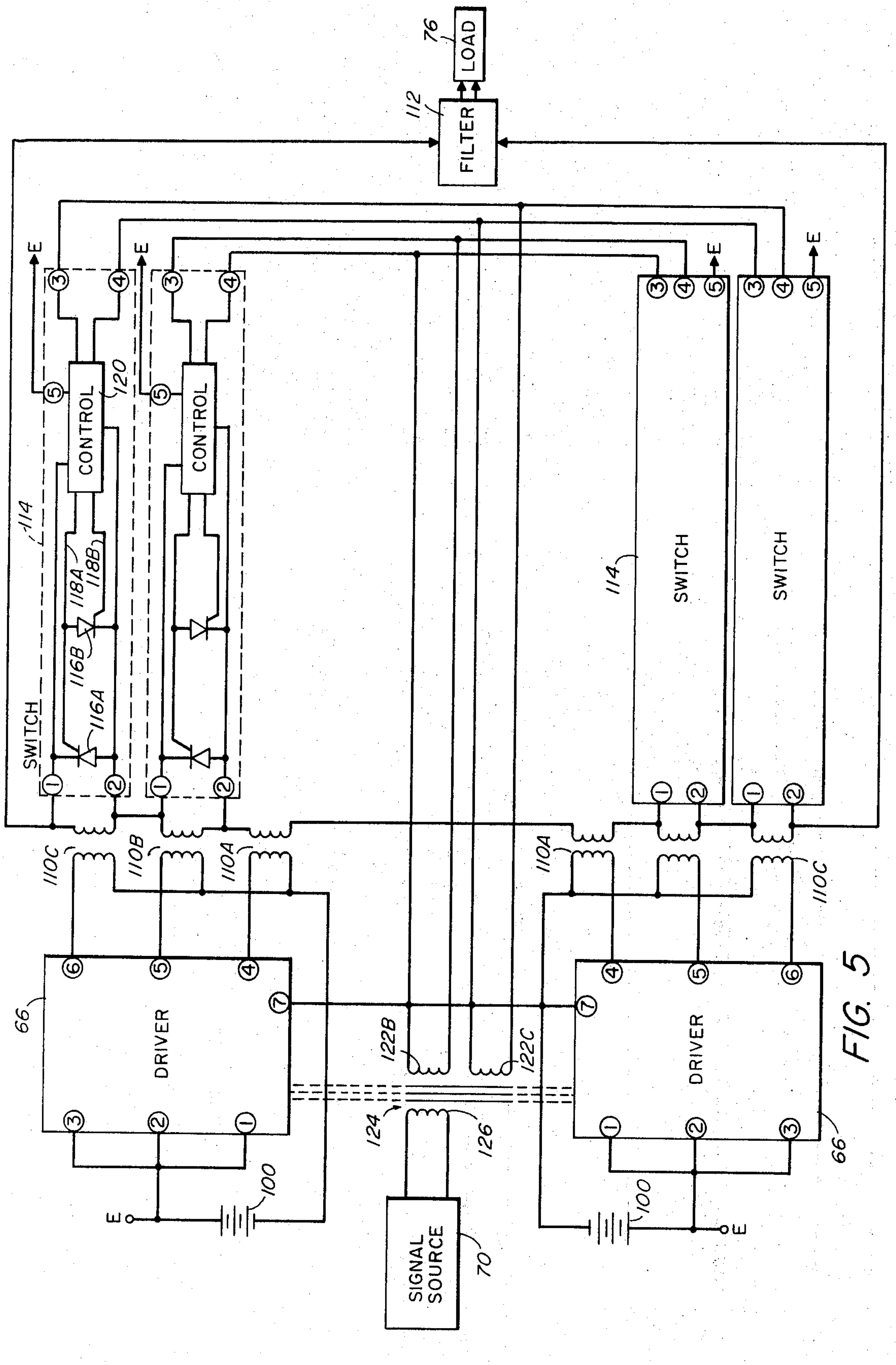
FIG. 5 shows a schematic diagram of a third embodiment of the invention wherein the reflected impedance of the load is varied by successively bypassing individual ones of serially connected transformers which couple a load to the parallel branches of amplifying elements.

Referring now to FIG. 5, there is shown an alternative embodiment of the invention which functions in a manner analogous to that of the circuit of FIG. 3 in that the effective value of the applied voltage E is varied during successive portions of each cycle of the input signal to minimize the value of the expression (E-IR) and thereby minimize the power dissipated within the driver units 66. The circuit of FIG. 5 differs from that of FIG. 4 in that the single transformer 102 of FIG. 4 has been replaced in FIG. 5 with a plurality of transformers 110A–C which are individually coupled to the driver units 66 without any mutual coupling between the various transformers 110A–C. The output windings of the various transformers 110A–C are serially connected via a filter 112 to the load 76. The filter 112 is optional and may be similarly employed with the circuit of FIG. 4 to provide further smoothing of the transitions in the flow of power from the terminals 4, 5 and 6 of the driver units 66 as the various transformers 110A–C are switched in and out of the circuit in a manner to be described. In a typical application such as the energization of a sonar transducer, in which case the load 76 is the sonar transducer, the electromechanical reactances of the transducer crystal and its mounting are sufficient to provide adequate smoothing of the aforesaid transitions. Where the filter 112 is utilized as shown in FIG. 5, the filter 112 is a band-pass filter having a bandwidth sufficient to pass the spectrum of the signal of the signal source 70 while being narrow enough to exclude spectral contributions associated with the switchings of the transformers 110A–C.

The output winding of each of the transformers 110B and 110C is connected to a switch 114 comprising, by way of example, a pair of oppositely poled controlled rectifiers 116A–B which are coupled via their control leads 118A–B to a well-known control circuit 120 for shorting the output windings of the respective transformers 110B–C. No switch 114 is utilized with transformer 110A. Each control circuit 120 is coupled via secondary windings 122B–C of transformer 124 which in turn is coupled to the signal source 70. The transformer 125 couples the input signal of the signal source 70 to the driver unit 66 in the same manner as did the transformer 72 of FIG. 3 and, furthermore, couples this signal to the control circuits 120. The two secondary windings 122B–C have different turns ratios with respect to the primary winding 126 of the transformer 124 so that different values of signal voltage are coupled to each of the control circuits 120. Thus each control circuit 120 energizes the control leads 118A–B at a different value of the input signal voltage. One terminal of each of the secondary windings 122B–C is connected to the return terminal of the battery 100 and a separate connection from each control circuit 120 via terminal 5 of the switch unit 114 is connected to the terminal E of the battery 100 for energizing the control circuits 120.

In operation, therefore, during the first half cycle of the input signal as the input signal voltage increases, the transformers 110A–C are energized via currents appearing successively from the terminals 4, 5 and 6 of one of the driver units 66 in the manner described previously with reference to FIG. 3. However, the circuit of FIG. 5 differs from that of FIGS. 3 and 4 in that the diodes 80A and 80B of FIG. 3 do not become back-biased during any portion of the cycle of the signal of signal source 70. This back-biasing does not occur because the input windings of the transformers 110A–C are not magnetically coupled as they are in the circuit of FIG. 4. Thus current flows continuously from terminal 4 of the driver unit 66 during the half cycle of the input signal. When the input signal is of a low value, the output windings of the transformers 110B–C are shorted out. The shorting by the switch 114 is discontinued for the transformers 110B–C, respectively, at precisely those times when, in the circuits of FIGS. 3 and 4, current was initiated at terminal 5 and terminal 6. This shorting of the output winding of transformer 110A results in a short circuit appearing in the collector circuit of the transistor 78A, seen in FIG. 3, and the shorting out of the output winding of the transformer 110B results in a short circuit appearing in the collector circuit of the transistor 78B. However, by virtue of the biasing action of the zener diodes 84B–C, the transistors 78B–C are rendered nonconducting when the short circuits appear in their respective collector circuits so that no power is dissipated in these transistors 78B–C when the short circuits are present.

With moderately high values of input signal voltage, the transistor 78B is conducting current, and the transistor 78A is saturated thereby dissipating essentially no power. With still higher values of input signal voltage the transistor 78B is also driven into saturation. As current is provided successively from the terminals 4, 5 and 6 of the driver unit 66, the voltage E of the battery 100 is applied successively through the transformers 110A–C at the times when the value of the signal is increasing. The series connection of the secondary windings of these transformers results in a summation of these applications of the voltage E so that the value of E is effectively increased during the first portion of the input signal cycle to follow the value of the product IR. In this way the expression (E-IR) is maintained substantially equal to zero during each cycle of the input signal so that minimum power is dissipated within the driver unit 66.

Figure 6:
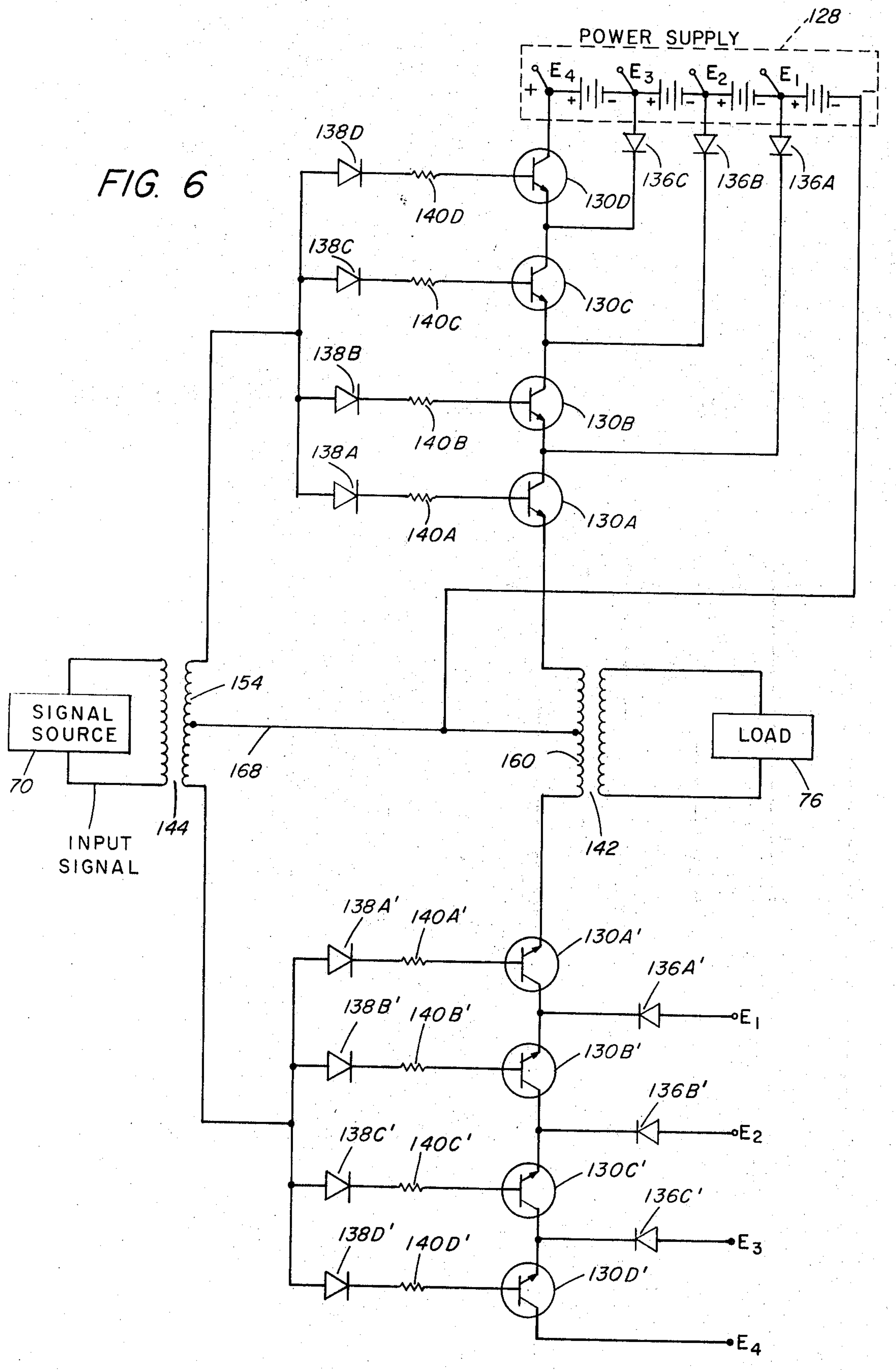
FIG. 6 shows a push-pull amplifier in which serially connected amplifying elements are switched during alternate half cycles of an input sinusoidal signal to the opposite terminals of an output coupling transformer and impress successively changing values of a supply voltage via the serially connected amplifying elements to the output coupling transformer for energizing a load.

Referring now to FIG. 6, there is shown a still further embodiment of the invention in which the value of the expression (E-IR) is minimized by varying the value of E during successive portions of each cycle of the input signal of the signal source 70 in a manner analogous to that described earlier with reference to the circuit of FIG. 3. In FIG. 6 a power supply 128 providing a plurality of voltages at terminals E1, E2, E3 and E4 is utilized in manner analogous to the power supply 68 of FIG. 3. In FIG. 6 the transistors are arranged in a series circuit as is shown by the transistors 130A–D in contrast to the parallel arrangement of the transistors 78A–C of FIG. 3. A further refinement of circuitry is also indicated in FIG. 6 in that the circuit is basically a push-pull amplifier which has been modified to permit the proper switching action of the serially connected transistors during both half cycles of the sinusoidal waveform of the input signal. The circuitry in the lower half portion of the figure is the mirror image of the circuitry in the upper half portion and the four transistors the lower half portion are identified by the prime symbol (′) and are correspondingly numbered 130A′–D′. Similarly, the other components of the lower half portion of the figure are also identified with the prime symbol (′) to distinguish the components of the lower half portion from the components of the upper half portion of the figure. The ensuing description will be directed to the unprimed components of the upper half portion of the figure, it being understood that this description applies in an analogous fashion to the primed components of the lower half portion of the figure.

The circuit of FIG. 6 further comprises diodes 136A–C connecting with the emitter terminals of respectively the transistors 130B–D, feed circuits comprising diodes 138A–D and resistors 140A–D connecting with the respective base terminals of the transistors 130A–D for supplying base current to the respective transistors 130A–D, and two transformers 142 and 144 respectively for coupling power to the load 76 and for coupling the input signal from the signal source 70.

For small values of the input signal applied to the transformer 144 the circuit of FIG. 6 functions in the conventional manner of push-pull amplifiers such that the transistor 130A conducts during one-half cycle of the sinusoidal input signal and the transistor 130A′ conducts during the other half cycle of the sinusoidal input signal. For larger values of the input signal voltage, the three transistors 130B–D become activated to pass current into the transformer 142 from respectively the terminals E2, E3 and E4 of the power supply 128. Thus, as the input signal rises in value, first the transistor 130A is energized via base current flowing through the diode 138A and the resistor 140A. As the input signal rises still further in value, the transistor 130B is energized with base current being applied via the diode 138B and the resistor 140B, the transistors 130C and 130D being subsequently energized in the manner just described for the transistors 130A–B. For maximum values of the input signal, the transistor 130D is thus energized. When the input signal is decreasing in value, the reverse procedure is followed in which first the transistor 130D and then the transistor 130C, the transistor 130B and finally the transistor 130A are rendered successively nonconducting.

Power is supplied via one of the terminals of the power supply 128, the particular terminal depending on which of the transistors 138A–D are conducting. Thus, when only the transistor 130A is conducting, power is supplied to the load circuit comprising the transformer 142 and the load 76 via terminal E1; and when only the transistors 130A–B are conducting, the power is supplied to the load circuit via the terminal E2. This supplying of power from successively different terminals of the power supply 128 is seen to occur because the potential of the collector terminal of the transistor 130A rises (in response to an increasing value of input signal) to a value greater than the potential of the terminal E1 thereby back biasing the diode 136A and rendering it nonconducting. For still larger values of the input signal, the potentials of the collector terminals of respectively the transistors 130B–C rise, in a similar manner, to sufficiently high values to back bias respectively the diodes 136B–C. The reverse procedure occurs when the magnitude of the input signal is decreasing so that the terminals E3, E2 and E1 are successively reconnected to the respective collector terminals of the transistors 130C, 130B and 130A.

During the second half cycle of the input signal, electric currents flow in the primed components of the lower half portion of the figure with these currents flowing through successive ones of the transistors 130A′–D′ and diodes 136A′–C′ in response to successive occurrences of base current in the diodes 138A′–D′ and resistors 140A′–D′ in the same manner as was described hereinabove with reference to the unprimed components of the upper half portion of the figure. Thus, the value of the expression (E-IR) is maintained substantially equal to zero during both half cycles of the sinusoidal input signal to minimize power dissipated within the transistors.

It is understood that the above described embodiments of the invention are illustrative only and that modifications thereof will occur to those skilled in the art. Accordingly, it is desired that this invention is not to be limited to the embodiments disclosed herein but is to be limited only as defined by the appended claims.

What is claimed is:

1. In combination:

a plurality of valve means which interconnect a source of power with a common load, each valve means being responsive to a common signal to pass power from said source to said load in accordance with the amplitude of said signal;

means coupled to each of said valve means for adjusting said response of each of said valve means to said signal so that each of said valve means is actuated sequentially in response to a different amplitude of said signal;

first transformer means having a plurality of taps in an input winding thereof, an output winding thereof being coupled to said common load, each of said taps being connected to respective ones of said valve means, each of said taps providing different values of load impedance reflected to respective ones of said valve means, the magnitude of said reflected impedance at each of said taps being dependent on the number of turns in the input winding of said transformer means between respective ones of said taps and a center tap of said input winding; and means coupled between respective ones of said taps and individual ones of said valve means and responsive to the amount of power passed by a subsequently actuated valve means for shutting off the flow of power from a previously actuated valve means when the power flow of said subsequently actuated valve means exceeds that of said previously actuated valve means to provide a smooth flow of power to said load, whereby the value of reflected load impedance coupled via said plurality of valve means to said common signal is switched in accordance with the sequential actuation of said valve means by said response adjusting means.

2. The combination according to claim 1 wherein said flow shutting means restores said flow of power in said previously actuated valve means when said subsequently actuated valve means is no longer actuated by said signal.

3. The combination according to claim 1 wherein first and second parts of said plurality of valve means are connected to opposite sides of said input winding of said transformer means to provide a push-pull circuit.

4. The combination according to claim 3 wherein said response adjusting means comprises branches each of which comprises a voltage divider circuit interconnecting terminals of said source of power.

5. The combination according to claim 4 further comprising a second transformer means having a plurality of output windings in circuit with corresponding branches of said response adjusting means for interconnecting said valve means with a source of signal.

6. The combination according to claim 5 wherein said shutting off means comprises diode means for inhibiting the flow of power through individual ones of said valve means when the power flow from another of said valve means is sufficiently large to present a back voltage across at least one of said valve means.

7. In combination:

a plurality of valve means each of which is coupled to a source of power for regulating a flow of power;

a transformer means for coupling said plurality of valve means to a load, said transformer means having a plurality of terminals providing separate values of impedance reflected from said load and connected to respective ones of said valve means, the value of said reflected impedance provided by each of said terminals to their respective valve means depending on the number of turns in a winding of said transformer between each of said terminals and a center tap terminal of said transformer means, each of said valve means being responsive to a common signal to pass power from said source via said transformer means to said load in accordance with the amplitude of said signal;

means coupled to individual ones of said valve means for adjusting said response of each of said valve means to said signal such that each of said valve means is actuated sequentially in response to a different amplitude of said signal; and means coupled to terminals of said transformer means and responsive to the amount of power passed by a subsequently actuated valve means for shutting off the flow of power from a previously actuated valve means when the flow of power of said subsequently actuated valve means exceeds that of said previously actuated valve means to provide a smooth flow of power to said load, whereby successive values of reflected load impedance are coupled to said source of power via said plurality of valve means in accordance with said sequential actuation of said valve means by said response adjusting means.

8. The combination according to claim 7 wherein said response adjusting means is a voltage divider circuit interconnecting terminals of said source of power, and wherein said flow shutting means comprises a diode in circuit between at least one of said valve means and a terminal of said transformer means.

9. In combination:

a plurality of valve means each of which is coupled to a source of power for regulating a flow of power;

transformer means for coupling a load to said plurality of valve means, said transformer means comprising a plurality of uncoupled transformer sections, the respective terminals of individual input windings of said transformer sections being connected to respective ones of said valve means, each of said valve means being responsive to a common signal to pass power from said source via said transformer means to said load in accordance with the amplitude of said signal, the output windings of said transformer sections being serially connected with said load;

means for adjusting said response of each of said valve means to said signal such that each of said valve means is actuated sequentially in response to a different amplitude of said signal; and means responsive to the amplitude of said signal for sequentially bypassing individual output windings of said transformer sections respectively in synchronism with said sequential actuation of said valve means, whereby the value of load impedance reflected to said valve means is altered sequentially in synchronism with said sequential actuations of the responses of said valve means.

10. The combination according to claim 9 further comprising a filter in circuit between the serial connection of said output windings and said load.

* * * * *